United States Patent
Novak

(10) Patent No.: US 7,103,905 B2
(45) Date of Patent: Sep. 5, 2006

(54) SYSTEM AND METHOD TO PROVIDE MEDIA PROGRAMS FOR SYNTHETIC CHANNELS

(75) Inventor: Robert Eustace Novak, Kirkland, WA (US)

(73) Assignee: Digeo, Inc., Kirkland, WA (US)

( * ) Notice: Subject to any disclaimer, the term of this patent is extended or adjusted under 35 U.S.C. 154(b) by 789 days.

(21) Appl. No.: 09/742,677

(22) Filed: Dec. 19, 2000

(65) Prior Publication Data

US 2002/0104099 A1 Aug. 1, 2002

Related U.S. Application Data

(60) Provisional application No. 60/228,609, filed on Aug. 28, 2000.

(51) Int. Cl.
G06F 3/00 (2006.01)
G06F 13/00 (2006.01)
H04N 5/445 (2006.01)

(52) U.S. Cl. .............................. 725/46; 725/40; 725/47

(58) Field of Classification Search .................. 725/46, 725/47, 40, 39, 38, 51, 54, 105, 109, 110, 725/112
See application file for complete search history.

(56) References Cited

U.S. PATENT DOCUMENTS

| 4,937,866 | A | * | 6/1990 | Crowther et al. ........... 380/241 |
|---|---|---|---|---|
| 5,534,911 | A | * | 7/1996 | Levitan ........................ 725/46 |
| 5,850,218 | A | | 12/1998 | LaJoie et al. |
| 6,025,837 | A | | 2/2000 | Matthews, III et al. |
| 6,081,263 | A | | 6/2000 | LeGall et al. |
| 6,208,746 | B1 | * | 3/2001 | Musgrave ................... 382/100 |
| 6,446,080 | B1 | * | 9/2002 | Van Ryzin et al. ...... 707/104.1 |
| 6,477,704 | B1 | * | 11/2002 | Cremia ........................ 725/35 |
| 6,486,920 | B1 | * | 11/2002 | Arai et al. ................... 348/563 |
| 6,526,411 | B1 | * | 2/2003 | Ward ........................... 707/102 |
| 6,670,971 | B1 | * | 12/2003 | Oral ............................ 345/769 |
| 6,774,926 | B1 | * | 8/2004 | Ellis et al. ................ 348/14.01 |
| 2001/0049720 | A1 | * | 12/2001 | Eyer ........................... 709/203 |
| 2002/0032019 | A1 | * | 3/2002 | Marks et al. ................ 455/414 |

\* cited by examiner

Primary Examiner—Vivek Srivastava
(74) Attorney, Agent, or Firm—Kory D. Christensen; Stoel Rives LLP

(57) ABSTRACT

An individual can upload media objects to a server and specify a manner in which the media objects are to be played as a media program to an end user. The media program can be provided to the end user via a synthetic channel, which can be tuned to by the end user as if tuning to a conventional television broadcast channel. Information related to the synthetic channel such as media program listings, can be provided in an electronic program guide. If a client terminal of the end user is tuned to the synthetic channel, the media program(s) scheduled by the individual who uploaded the media objects are streamed to the client terminal for viewing by the end user.

29 Claims, 11 Drawing Sheets

802

| | 8:00 | 8:30 | 9:00 | 9:30 |
|---|---|---|---|---|
| NBC | JUDGE HATCHETT | JUDGE HATCHETT | OPRAH WINFREY | |
| ABC | NORTHWEST AFTERNOON | | ROSIE O' DONNELL | |
| CBS | MONTEL WILLIAMS | | INSIDE EDITION | POWER OF ATTORNEY |
| FOX | DIGIMON: DIGITAL MONSTERS | POWER RANGERS LIGHTSPEED RESCUE | X-MEN | DIGIMON: DIGITAL MONSTERS |
| CNN | INSIDE POLITICS | MONEYLINE NEWS HOUR | | CROSSFIRE |
| MSNBC | DECISION 2000 | DECISION 2000 | DECISION 2000 | |
| JOE'S TV CHANNEL | BABY'S FIRST | MOM'S BIRTH... / GRADUATI.. | FAMILY REUNION | CHRISTMAS '99 |

804

| | 8:00 | 8:30 | 9:00 | 9:30 |
|---|---|---|---|---|
| NBC | JUDGE HATCHETT | JUDGE HATCHETT | OPRAH WINFREY | |
| ABC | NORTHWEST AFTERNOON | | ROSIE O' DONNELL | |
| CBS | MONTEL WILLIAMS | | INSIDE EDITION | POWER OF ATTORNEY |
| FOX | DIGIMON: DIGITAL MONSTERS | POWER RANGERS LIGHTSPEED RESCUE | X-MEN | DIGIMON: DIGITAL MONSTERS |
| CNN | INSIDE POLITICS | MONEYLINE NEWS HOUR | | CROSSFIRE |
| MSNBC | DECISION 2000 | DECISION 2000 | DECISION 2000 | |
| JOE'S TV CHANNEL | BABY'S FIRST / MOM'S BIRTH... | GRADUATI.. | FAMILY REUNION | CHRISTMAS '99 |

802 → (top-left arrow); 804 → (top-right arrow)

FIGURE 8

SYSTEM AND METHOD TO PROVIDE MEDIA PROGRAMS FOR SYNTHETIC CHANNELS

CROSS-REFERENCE TO RELATED APPLICATIONS

The present application claims the benefit of U.S. Provisional Patent Application Ser. No. 60/228,609, filed Aug. 28, 2000, entitled "SYNTHETIC BROADCAST CHANNELS," which is incorporated herein by reference.

BACKGROUND OF THE INVENTION

1. Field of the Invention

The present invention relates generally to transmission of information, and in particular but not exclusively, relates to the transmission of audio and/or video information over communication channels that simulate television broadcast channels.

2. Background Information

The Internet is a popular tool for viewing many different types of information. For example, commercial or government web sites provide web pages that contain information on a multitude of subjects that may be of interest to users viewing the web pages. The information available in the web pages can be in many different formats, such as text, graphics, video, and audio.

In addition to commercial or government web sites, individuals can also create "personal" web sites and web pages on the Internet. For example, a family can create a "Jones Family" web site having a uniform resource locator (URL) address or domain name of Jones-Family.com. In this personal web site, information about the Jones family can be provided. Examples of such information can include family history, birthday or other special event announcements, photographs of family members, video clips from a recent trip, audio clips of a child's first words, etc.

To make such information available on the personal web site, the personal web site first has to be established/created (e.g., through a web-hosting party, Internet service provider, etc.). Next, the information to be made available via the personal web site is uploaded for storage to a server that hosts the personal web site. Once the personal web site is functional, third parties may access the personal web site through the Internet to view the information displayed in the web pages.

Although personal web sites and/or other web sites have a variety of available information, they can be clumsy or difficult to access/use at times. This can be particularly true with regards to users who are not computer-savvy. The casual or unfamiliar Internet user can often be easily overwhelmed, discouraged, or confused by having to enter URL addresses to locate the specific web site, click multiple hypertext links to view a photograph or other item of information, wait while an audio or video file downloads, struggle with slow or unreliable computer connections to the Internet, etc.

Accordingly, improvements are needed in the manner in which information is provided to end users.

SUMMARY OF THE INVENTION

The above-described problems relating to the Internet may be overcome by the present invention. The present invention comprises a system and method to allow presentation of media objects to an end user at a client terminal, such as a television set. In accordance with an embodiment of the invention, an individual can upload media objects to a server and specify a manner in which the media objects are to be played as a media program to an end user, including the scheduling and sequencing of the media objects. The client terminal of the user can be subscribed or provisioned such that information related to the media objects, such as media program listings, can be provided in an electronic program guide (and updated if needed). The media program can thereafter be provided to the end user via a synthetic channel, which can be tuned to or selected by the end user as if tuning to a conventional television broadcast channel. An aspect of the invention provides a method that establishes a synthetic channel as a channel among a plurality of channels of an interactive video display system. The synthetic channel is provisioned with information to access and display at least one media object, comprising part of a media program, stored in a storage location if the synthetic channel is selected by a client terminal. The media program having the media object is provided to the client terminal via the synthetic channel.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 8 shows a first electronic program guide that is provisioned to include a synthetic channel in accordance with an embodiment of the invention.

DETAILED DESCRIPTION OF THE ILLUSTRATED EMBODIMENTS

Figure 1:
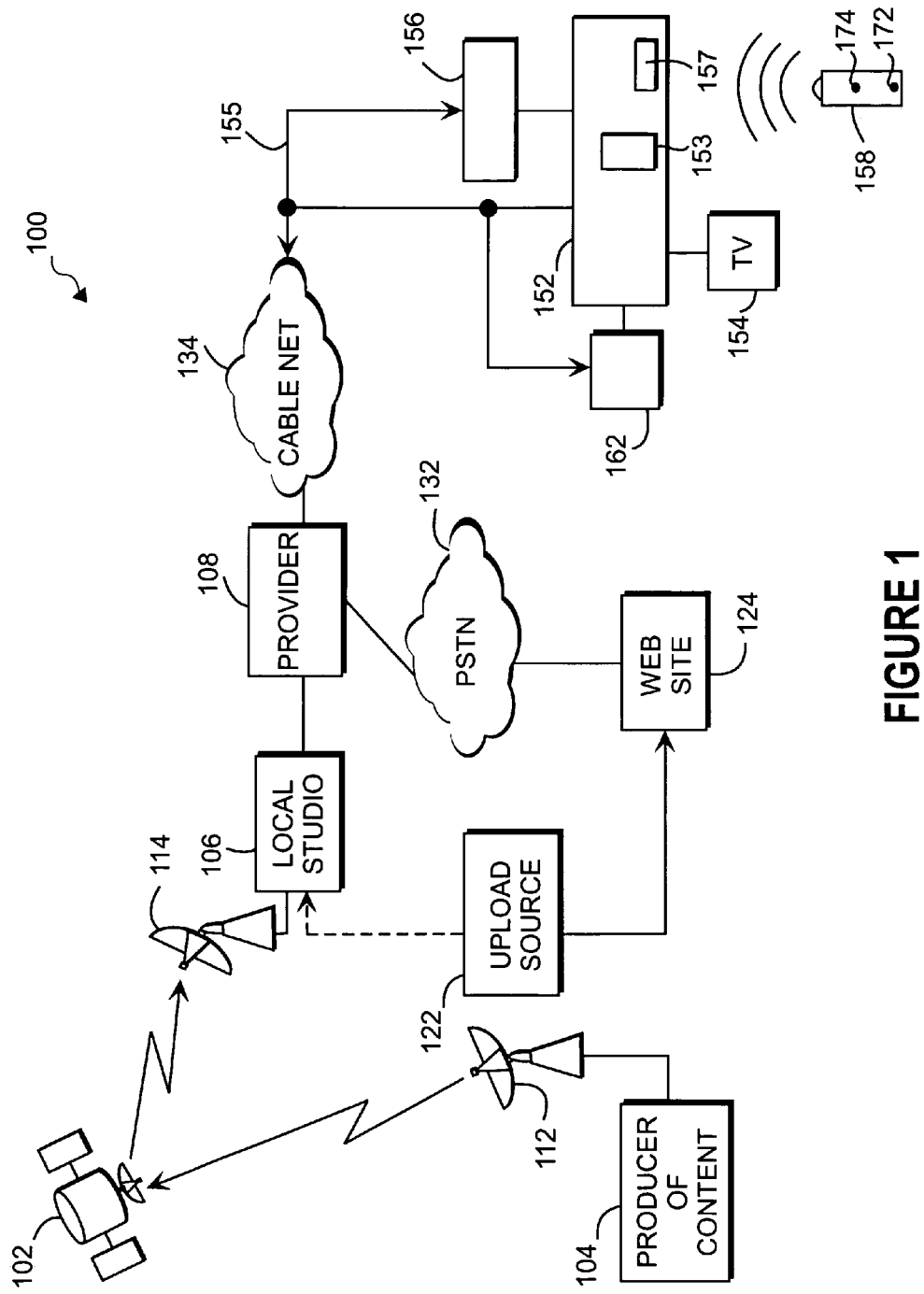
FIG. 1 shows a first example of an interactive video casting system for implementing an embodiment of the invention.

Embodiments of a method and system to provide media programs for synthetic channels are described herein. In the following description, numerous specific details are provided, such as the description of system components in FIGS. 1–3, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, an embodiment of the invention includes a method to provide a media program or media object to an end user. The media program can include streaming media (audio and video), digital music, flash animation, etc. In accordance with one embodiment of the invention, an individual or other party acting analogously to a "program director" uploads the media objects to a server. That is, the individual can control the content type, length, sequence, availability, etc. of the media objects that are uploaded to the server. One or more of the media objects can form a media program that can be provided from the server. The server can comprise part of or be communicatively coupleable to an interactive video casting system, such as an interactive television system.

Once the media object(s) is uploaded to the server, information related to the media objects can be displayed in an electronic program guide (EPG) or otherwise made available to selected subscribers or end users of the interactive video casting system. In an embodiment, the media objects are made available via a synthetic channel listed in the EPG. The television broadcast channel simulates a conventional television broadcast channel in that, to the end user, it can be tuned to and display programming in a manner similar to that of a conventional television broadcast channel. Unlike a conventional television broadcast channel, however, the synthetic channel is able to provide the media programs according to the type, sequence, length, desired scheduled play time, etc. specified by the individual who uploaded the media objects to the server. In this manner, the end user can simply tune a television set to the synthetic channel (e.g., by selecting the synthetic channel from the EPG), instead of having to navigate through complicated URL addresses and hyperlinks on the Internet, when the end user wishes to see video clips of family members, animation created by the uploading individual, and other media objects.

FIG. 1 shows an example arrangement of an interactive video casting system 100 for implementing an embodiment of the invention. A production company 104 produces programming content for transmission to viewers. The transmission is sent over an uplink channel to a satellite 102. The satellite 102 then transmits the programming content over a downlink channel to a local studio 106. The local studio 106 can insert additional programming (e.g., regional programming) and/or advertisements as needed into the programming content. The content with the insertions is then transmitted from the local studio 106 to a cable service provider 108. The cable service provider 108 then delivers the television signal over a cable network 134 to cable subscribers.

The cable network 134 is provided by the cable service provider 108 to distribute the programming content to cable subscribers. A set top box (STB) 152, located on the premises of a cable television subscriber or end user, receives the programming content or television signal, and delivers the television signal to the subscriber's television set 154. Alternatively or in addition, the television signal can be broadcast over a wireless medium and received by a traditional aerial antenna or by a satellite dish, and then delivered to the set top box 152. Alternatively or additionally, features and functionality of the set top box 152 may be integrated into a type of advanced television or other display device.

Moreover, embodiments of the invention can use other types of broadcast media, including but not limited to, digital cable systems, satellite, very-high-data-rate digital subscriber line (VDSL), web casts, etc. The features provided by the television set 154 can also be provisioned, in one embodiment, by a personal computer (PC) suitably configured with an adapter to convert television signals into a digitized format, and then to deliver the television signals to the video portion of the computer for display. It is noted that the invention is not limited to any one configuration of display hardware, as embodiments of the invention will work equally well using alternative reception and display arrangements.

In accordance with an embodiment of the invention, a connection to a communication network is provided for the cable subscriber. In one embodiment, the connection can be made via a cable modem 156 over a bi-directional communication link 155 to a cable modem termination system within the cable provider's 108 equipment. The connection continues to a data communication network, such as the Internet, by way of a public switched network (PSTN) 132. The PSTN network 132 is provided herein as an example, and it is understood that other types of networks may be used for connectivity to the Internet. A cable modem arrangement can be used because of its high bandwidth capability. In situations where some cable companies are not equipped to provide cable modem service to their customers, various other arrangements can be made. For example, a conventional modem connection can be used to access the Internet over a telephone line. As another example, Internet access can be gained over a DSL connection or an integrated services digital network (ISDN) connection using a telephone line. Wireless systems are also available for providing Internet access. In one embodiment, downstream data transmission can occur via cable or satellite, and upstream data transmission can occur via a telephone line or a satellite return path.

It is noted that the Internet is chosen as an example of a data communication network because it is a well-established network, and connectivity to the Internet is easily made. However, it is noted that a global communication network, such as the Internet, is not required to practice other embodiments of the invention. A locally provided and maintained communication network may be used in an embodiment.

Continuing with FIG. 1, the set top box 152 can include a transceiver 157, such as an infrared (IR) or radio frequency (RF) transceiver, that can exchange signals with a remote control unit 158 or other user input device. The set top box 152 can be a component that is separate from the television set 154 as shown in FIG. 1, or its features can be built into circuitry of the television set 154 (e.g., an interactive television set). The set top box 152 enables a viewer to select a television program (or channel) to view and then delivers the television program to the television set 154. A storage unit 162 can also be coupled to or be a part of the set top box 152. The storage unit 162 can comprise a machine-readable storage medium such as a cache, buffer, memory, diskette, compact disk, tape, or the like and their associated hardware, in one embodiment. In another embodiment the storage unit 162 can include a video cassette recorder (VCR). In another embodiment, the storage unit can include a hard disk such as a digital or personal video recorder (DVR or PVR).

As noted above, the local studio 106 can insert additional programming into the received transmission, for example, to provide cable content that includes locally provided channels. The programming is then distributed to customers over the cable network 134. In addition to local program insertion, the local studio 106, the cable service provider 108, or other party can insert Internet-related data into the received television transmission, or allocate specific channels for Internet-related traffic. In this manner, cable subscribers are able to access and use the Internet via their television set 154, in a manner that allows them to obtain information from the Internet along with television programming.

For example, triggering, announcement, or resource information can be included and sent using the Advanced Television Enhancement Forum (ATVEF) standard, in a manner known by those skilled in the art. For instance, a uniform resource locator (URL) address can be embedded in the broadcast stream. Other standards that may be used include triggering mechanisms from Wink and WorldGate. Another technique is to embed code or a script in the stream that is received by the client (e.g., at the set top box 152) to provide the information, or that runs on another computer in the subscriber's home which is connected to the Internet.

In accordance with one embodiment of the invention, information from the Internet can be provided to the television set 154 via a transmission control protocol/Internet protocol (TCP/IP) channel that is accessible via the cable modem 156. Thus, television programming signals are provided on some channels (with the television programming signals also being capable to carry triggers, URLs, etc.), while Internet information can be provided via one or more TCP/IP channels. This Internet information provided via the TCP/IP channel can include various media objects in an embodiment, as will be described later below.

Although TCP/IP has been described herein as one of the protocols that the channel(s) can use, it is to be appreciated that these channels or other channels can use other protocols as well. Examples include hypertext transfer protocol (HTTP), file transfer protocol (FTP), user datagram protocol (UDP), or other protocols.

In accordance with an embodiment of the invention, an electronic program guide (EPG) 153 may be provided. An EPG is an electronic listing of scheduled television programming, identifying channels, broadcast times, television programs, program summaries, actors/actresses, etc. The EPG 153 may be generated/produced by the local studio 106, cable service provider 108, or other party or combination of parties. The EPG 153 may be provided to and stored in the set top box 152 (or other local storage unit) for access and viewing by the cable subscriber. Alternatively or in addition, the EPG 153 may be stored at a head-end or other system of the cable service provider 108, or at a third party system or other location.

In one embodiment of the invention, the cable subscriber can tune to any particular channel or program by viewing the EPG 153, and then clicking on a listing in the EPG 153 to automatically tune to the desired channel. In another embodiment, the EPG 153 can be a simple display on the screen of the television set 154, and the cable subscriber can use other techniques to tune to a desired channel (such as selecting a synthetic channel number like 2005). In yet another embodiment, the cable subscriber can tune to any particular channel or program, such as by channel surfing, without necessarily having to view/use the EPG 153.

In one embodiment of the invention, an upload source 122 is able to upload/store media objects to a server. The upload source 122 can comprise, for example, an individual or organization wishing to make information available via the Internet, and can include the device(s) that they use to upload information, such as a set top box, a PC, or other access device(s). The server thus makes the media objects available and accessible through the Internet via a web site 124 or via other techniques/connections. Examples of media objects that the upload source 122 can upload to the server or web site 124 can include, but not be limited to, audio and video clips, JPEGs, recorded audiovideo clips of television programs, sequenced JPEGs with attached audio files, MPEGs, MP3 files, web camera video clips, flash animation, text and graphics, or other files and media file types. In an embodiment, one or more of these media objects can be provided to end users via the use of streaming techniques, although it is to be appreciated that other techniques may be used in another embodiment.

The upload source 122 can upload media objects to a web site 124 at a server. The web site 124 can be stored in any suitable server accessible via the Internet. In accordance with one embodiment, the upload source creates the web site 124 before uploading media objects to it. The upload source 122 can own the server that stores the web site 124, or the web site 124 or server may be hosted by third parties. In accordance with one embodiment of the invention, the upload source 122 can control the type, sequence, length, schedule of play, etc. of the media objects to be streamed from the server, thereby analogously acting as a "program director." The manner in which this may be accomplished in one embodiment is described later below.

Also in an embodiment, the upload source 122 can have an agreement or other communication with the local studio 106 and/or with the cable service provider 108, such that the presence of and URL address of the web site 124 is known to these parties. Thus, these parties can make arrangements to allow cable subscribers to be provided with media programs from the web site 124 and to provide/update the EPG 153 with media programs that are available from the web site 124. The communication/agreement between the local studio 106 (and/or cable service provider 108) and the upload source 122 is shown symbolically by an arrow in FIG. 1.

Figure 2:
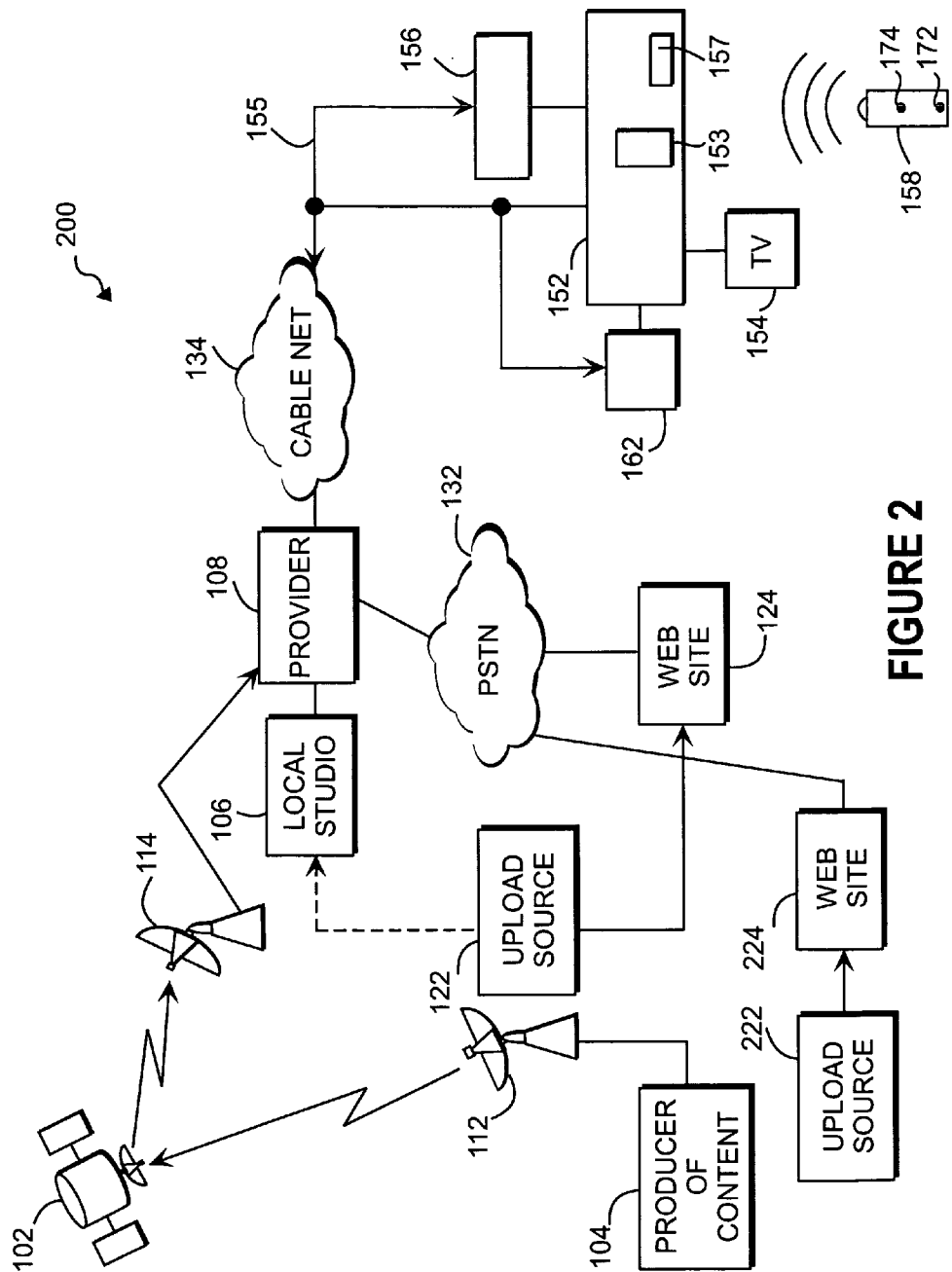
FIG. 2 shows a second example of an interactive video casting system for implementing an embodiment of the invention.

FIG. 2 shows another example of an interactive video casting system 200 for implementing an embodiment of the invention. In the system 200 shown in FIG. 2, the media object (e.g., video program) may be downloaded to a receiving station, such as a head-end (H/E) of the cable service provider 108 or the subscriber's set top box 152, rather than or in addition to the local studio 106. A reverse channel from the cable service provider 108 to the local studio 106 is provided so that the local studio 106 can insert additional programming content and feed the television signal back to the cable service provider 108.

Also in FIG. 2, another upload source 222 is shown, with the capability to upload media objects for a web site 224. The web site 224 is stored in a server accessible via the Internet. This illustrates that multiple parties may upload data for multiple web sites, which may or may not necessarily reside in the same server. Also, different from the upload source 122, the upload source 222 can make its uploaded media objects available to selected subscribers of the system 200 without necessarily having an existing arrangement/agreement with the local studio 106 and/or with the cable service provider 108 (as symbolically shown in FIG. 2 by a lack of a connecting arrow from the upload source 222 to the local studio 106 or to the cable service provider 108). In such an embodiment, software of the end user's set top box 152 can independently establish a connection with the web site 224 and add the synthetic channel to the EPG 153 for reception of media programs, without or with minimal intervention/involvement by the local studio 106 and/or by the cable service provider 108.

As noted above, Internet access is not necessary to practice the invention. A locally provided network may be within the scope of the invention as claimed. The cable provider 108 can supply the foregoing features, for example, by providing a web site or "walled garden" that is accessed by its subscribers. In such a case, the cable provider 108 serves as an intermediary and submits the purchases to the actual merchants 122 or 222.

Figure 3:
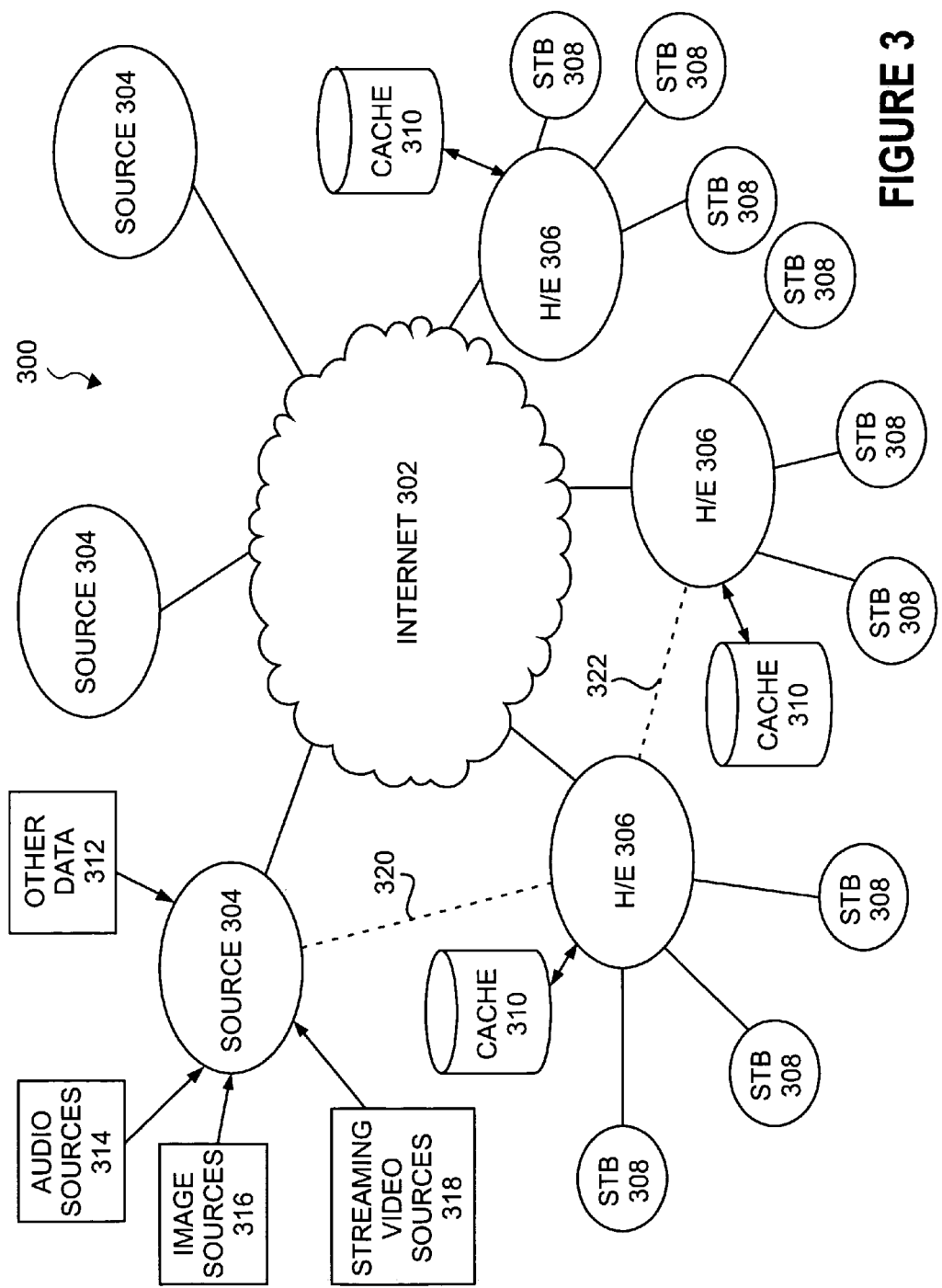
FIG. 3 shows an example of an interactive video casting system with which an embodiment of the invention can operate in cooperation.

FIG. 3 shows an example of an interactive video casting system 300 with which an embodiment of the invention can operate in cooperation. The system 300 can be similar to or combined with the systems 100 and 200 shown in FIGS. 1 and 2, respectively. In accordance with an embodiment of the present invention, the system 300 can be integrated with a cable television distribution system. The system 300 includes an Internet 302, a plurality of content sources 304, a plurality of distribution centers (depicted as the head-ends or H/Es 306), and a plurality of client terminals 308 (depicted as set top boxes). In addition, a content source 304 is depicted as receiving data from image sources 316, streaming video sources 318, audio sources 314, and other data sources 312.

The image sources 316, streaming video sources 318, audio sources 314, etc. can comprise the various media objects that are uploadable by the upload source 122. These media objects can be uploaded by the upload source 122 directly, or the upload source 122 may upload links that point to locations where these media objects can be obtained (e.g., a hypertext link pointing to another web site or server from which the media objects can be streamed).

The plurality of content sources 304 is coupled to the Internet 302. A content source 304 may comprise a web site, server, web site portal, etc. that can provide media objects to end users. Each content source 304 may have various image sources 316, streaming video sources 318, audio sources 314, etc. coupled to it. Various other feeds, servers and sources may also be coupled to the content source 304 of FIG. 3, or coupled to the production company 104, cable network 134, web sites 124 and 224, or to other components of the systems shown in FIGS. 1 and 2.

The Internet 302 comprises a network of networks and is well known in the art. Communications over the Internet 302 can be accomplished using standard protocols such as TCP/IP, HTTP, FTP, UDP, or other protocols. The Internet 302 is coupled to the plurality of distribution centers 306, and each distribution center 306 is in turn coupled to a plurality of client terminals 308, which may comprise a set top box, a PC, an interactive television set, or another type of communication device or display device.

In alternative or in addition to the Internet 302 being used to distribute multimedia content from the content sources 304 to distribution centers 306, communications channels or networks 320 apart from the Internet 302 may couple one or more content sources 304 to one or more distribution centers 306. One example of such an alternate path for communications is illustrated by a first dashed line 320 in FIG. 3. Alternately or additionally, peering connections may exist between distribution centers 306. One example of such peering is illustrated by a second dashed line 322 in FIG. 3. Other configurations are also possible and are included within the scope of the present invention.

Caches 310 may be provided at (or coupled to) the distribution centers 306. Such caches 310 may be used to increase the performance in the delivery of multimedia content to the client terminals 308. For example, larger files for video and other high bandwidth content may be stored in such caches 310, which may be closer to the client terminals 308 than to the content sources 304. In addition, reliability and guaranteed bandwidth may be provided because the Internet 302 is not in-between such caches 310 and the client terminals 308.

As described above with reference to FIGS. 1–3, many different types of client terminals or display devices, in addition to the television set 154, may be used to display or access television programming, Internet or web page content, content from the content sources 304, etc. Examples of such display devices include, but are not limited to, PCs, personal digital assistant (PDA) devices, handheld wireless devices (such as cellular telephones), or other devices having a display screen. In one embodiment, audio devices may be used in addition to or instead of display devices, to play audio versions of the programming or content provided by the interactive video casting systems of FIGS. 1–3.

In accordance with one embodiment of the invention, different or multiple portals may be used to access the information provided through the interactive video casting systems of FIGS. 1–3, based on the type of client terminal being used by the end user. That is, for example, a television portal may be provided for an end user that uses the television set 154 to access the information. A PC portal may be provided for an end user that uses a PC to access the information. Portals can be provided for end users that use cellular telephones, PDAs, audio devices, etc. to access the interactive video casting systems of FIGS. 1–3.

Such portals may be provided in several possible ways. In one embodiment, the client terminal (e.g., the end user's display device or audio device) can be suitably configured with an adapter that includes hardware and software. The adapter converts the television signals, the Internet or web page content, or other information provided from the interactive video casting system into a digitized format or other format that is compatible with the operational features of the client terminal.

In another embodiment, the cable provider 108 can deliver signals having different formats to the various client terminals, with the client terminals not necessarily having special adapters. Therefore, as an example, the cable provider 108 or other party can generate/deliver information (e.g., television programming, web page content, etc.) having a format that is compatible for end users that receive the information via the television set 154. The cable provider 108 or other party can also generate/deliver the same information (e.g., simultaneously with the television portal on the same communication link, separately on a different communication link, on-demand independent of the television portal, etc.) using a format that is compatible with end users that receive the information via PCs, PDAs, cellular telephones, etc. Thus, the term "interactive video casting system" is used to describe generally a system that can deliver video information over any network and any network-compatible device by broadcasting, multicasting, or unicasting. An "interactive television system" is one type of or one means of access to an "interactive video casting system."

As described above, an embodiment of the invention allows the upload source 122 to upload media objects to a server, and also specify and control the manner in which the media objects are to be played/provided from the server. For example, several different video clips may be uploaded by the upload source 122 to the server, and then the upload source 122 can specify the sequence and time at which the media objects are to be played or made available to an end user, thereby producing a media program.

Figure 4:
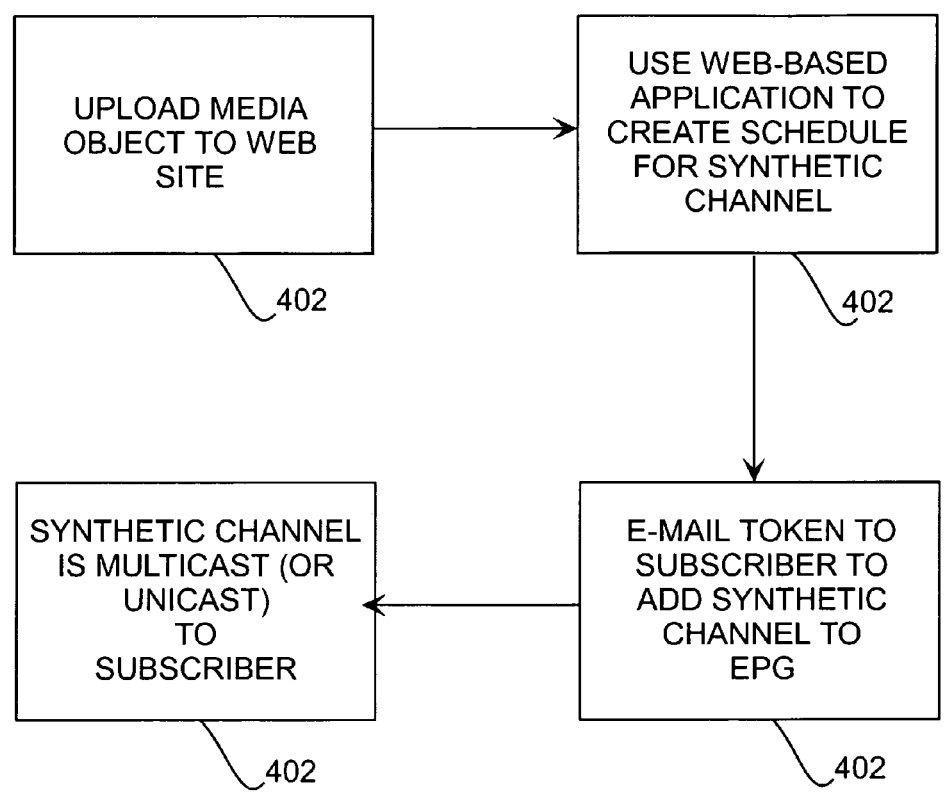
FIG. 4 is a flow diagram illustrating a method to provide a media program to a synthetic channel in accordance with an embodiment of the invention.

FIG. 4 is a flow diagram illustrating a method to provide a media program to a synthetic channel in accordance with an embodiment of the invention. At a block 402, one or more media objects, such as video clips, are uploaded to the web site 124 by the upload source 122 (e.g., an individual or consumer). This can also include a server operated from an individual or consumer web server that is connected to the Internet with an "always available" Internet connection such as DSL or cable modem. Thus, an embodiment of the invention allows an ordinary individual to perform the uploading, instead of or in addition to a typical "professional studio." The upload source 122 can comprise or can use a set top box, a PC, or other access device to upload the media objects to the web site 124 (e.g., to a server).

Next at a block 404, the individual can use an application to create a schedule of programming for the synthetic channel that is to play the media objects. In accordance with an embodiment of the invention, a web-based application may be used by the individual to create the program schedule from the web site 124. It is to be appreciated that other types of tools or applications may be used in addition to or instead of a web-based application.

At a block 406, the individual can e-mail a token or other electronic file to an end user to subscribe the end user's client terminal (e.g., the end user's set top box 152). That is, the token may be utilized to add the synthetic channel to the end user's EPG 153 in one embodiment. For example, the token may trigger an application (or the token itself can be an application) that causes the EPG 153 and/or the set top box 152 to add the synthetic channel to the program listings of the EPG 153 and to monitor the web site 124 for media program information. It is to be appreciated that other types of mechanisms (besides email) may be used to implement subscription to the synthetic channel. For instance, the end user can separately receive software (in a diskette sent via postal mail, as an example) and then run that software to update the EPG 153 or to otherwise subscribe to the synthetic channel. Other embodiments of subscription techniques are described below with reference to FIG. 11.

Subsequently, the EPG 153 and/or the set top box 152 can communicate with the web site 124 to get program updates for the synthetic channel, as well as communicating with the web site 124 to receive the uploaded media objects themselves when the synthetic channel is selected by the end user. According to an embodiment, the program updates for the synthetic channel may be obtained from the web site 124 periodically, such at the same frequency that the conventional television channel listings in the EPG 153 are updated, for example. In an embodiment, polling techniques may be used by the EPG 153 and/or the set top box 152 to poll the web site 124 for purposes of obtaining program updates. The subscription of the set top box 152, the addition of the synthetic channel to the EPG 153 listings, or the providing of information to allow the EPG 153 and/or the set top box 152 to obtain updated program listings or uploaded media objects from the web site 124 can be thought of as elements of a "provisioning" of the synthetic channel.

Next in a block 408 of FIG. 4, the media program is transmitted via the synthetic channel to the subscribed end user's client terminal (e.g., to the set top box 152 and television set 154), using multicasting (or unicasting) techniques, for example. Various techniques can be used to transmit the media program to one or more client terminals of end users. With multicasting or other forms of Internet transmission, multiple subscribers can share the same bandwidth for a channel. A single virtual circuit (or socket) connection between the web site 124 and each individual subscriber can also be implemented in an embodiment. It is understood that other transmission techniques may be used.

Figure 5:
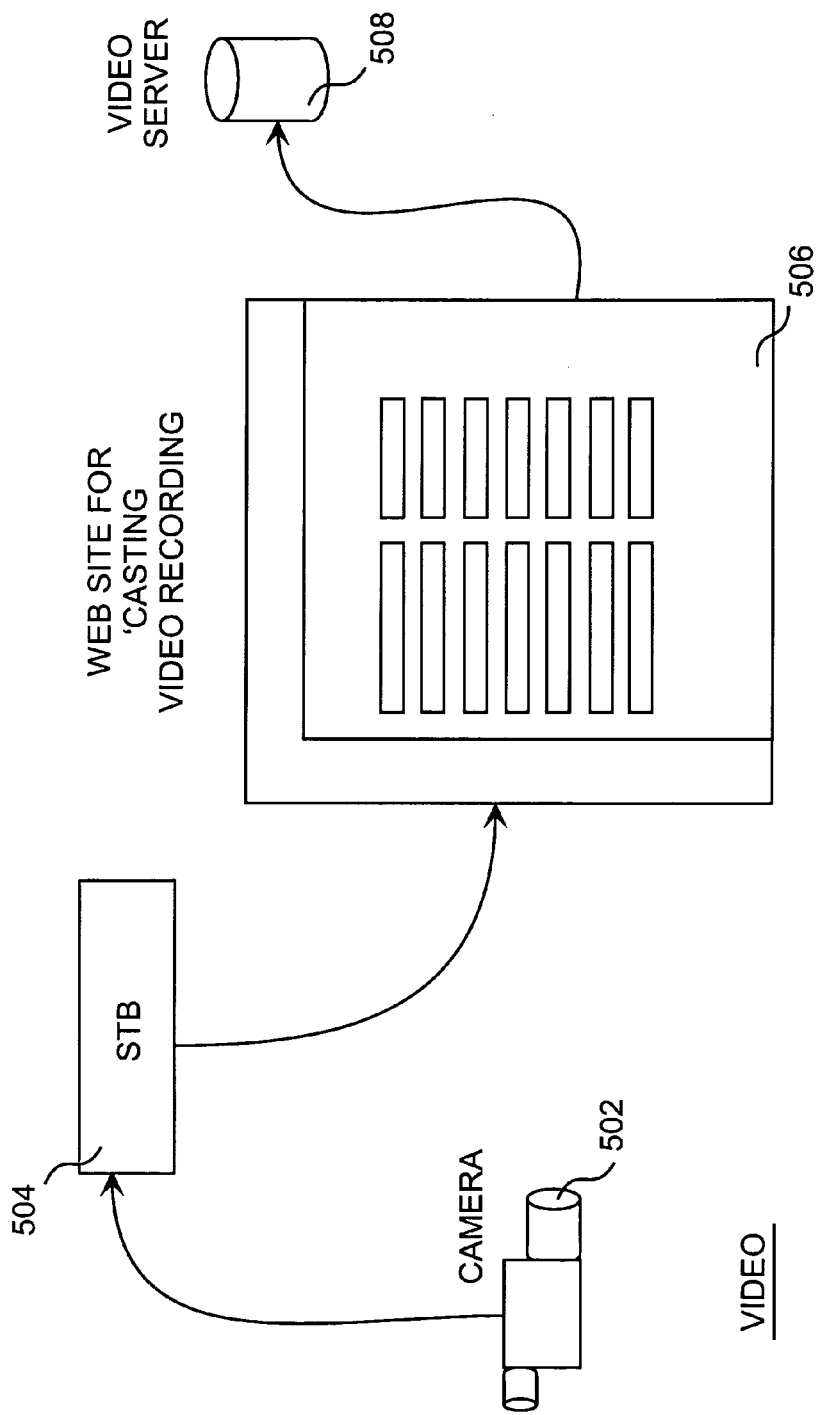
FIG. 5 shows a technique to store and schedule media objects (for example, video) on a server in accordance with an embodiment of the invention.

To further illustrate the above-described embodiments, FIG. 5 shows a technique to store and schedule media objects (such as video) on a server in accordance with an embodiment of the invention. The video may be created using a video camera 502 or other imaging device. The video camera 502 may be coupled to (or have its video recording output provided to) an access device, such as to a PC or a set top box 152. The set top box 152 is used to upload the video recording to web site 124 via use of an interface 506. The web site 124 and its video contents may be stored in a server 508, such as a video server or other storage location. The video recordings can then be subsequently provided to subscribed end users.

Figure 6:
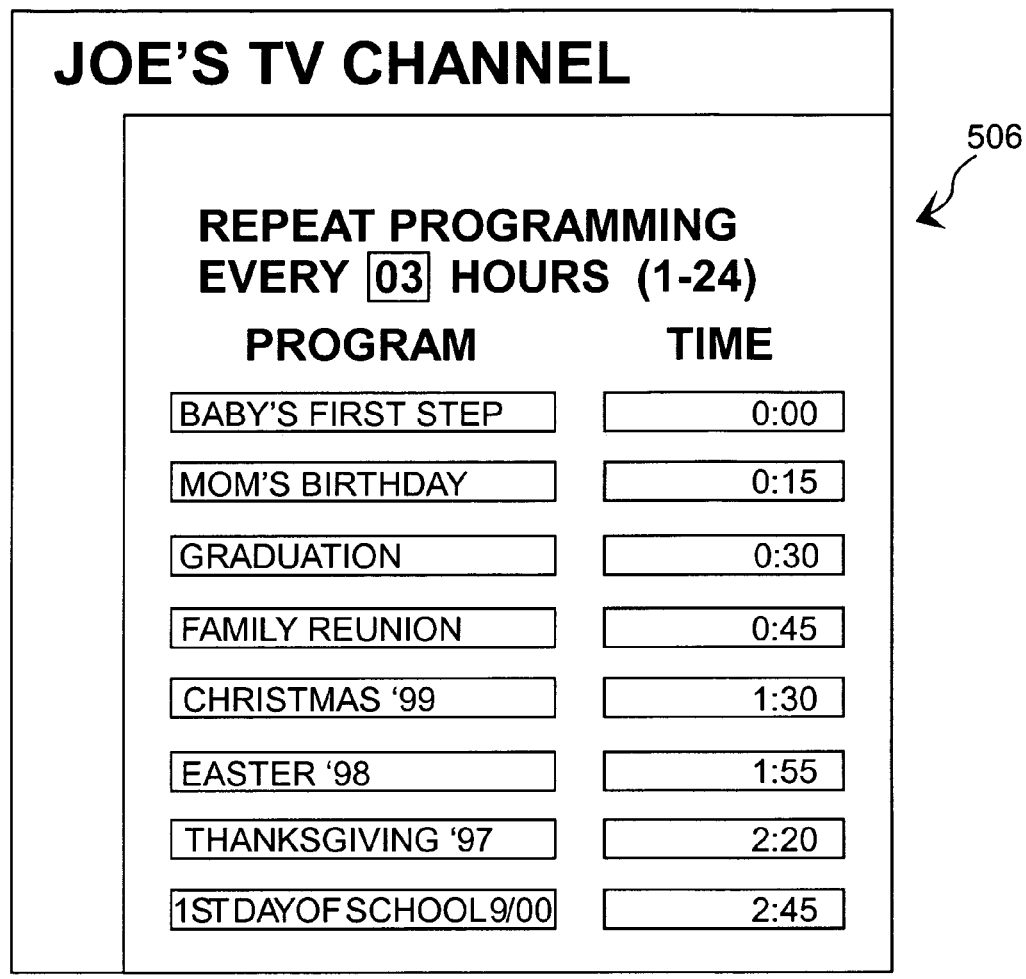
FIG. 6 shows a first example of an interface that can be used to schedule media objects for a media program in accordance with an embodiment of the invention.

FIG. 6 shows a first example of the interface 506 that can be used by the uploading individual to schedule media objects for a media program in accordance with an embodiment of the invention. The interface 506 may be implemented in a web-based application, for instance. In the example of FIG. 6, the uploading individual has created a program schedule for his synthetic channel called "Joe's TV Channel." As shown in the example, the air time of the various media objects can be set for specific times and can also be set to repeat according to various patterns set by the uploading individual. As an illustration, the uploading individual can use the interface 506 to set a repeat the playing of a certain media object (e.g., a video clip) at 10 minutes after even-numbered hours. Virtually an infinite number of possible settings for the playing of the media objects is possible.

Figure 7:
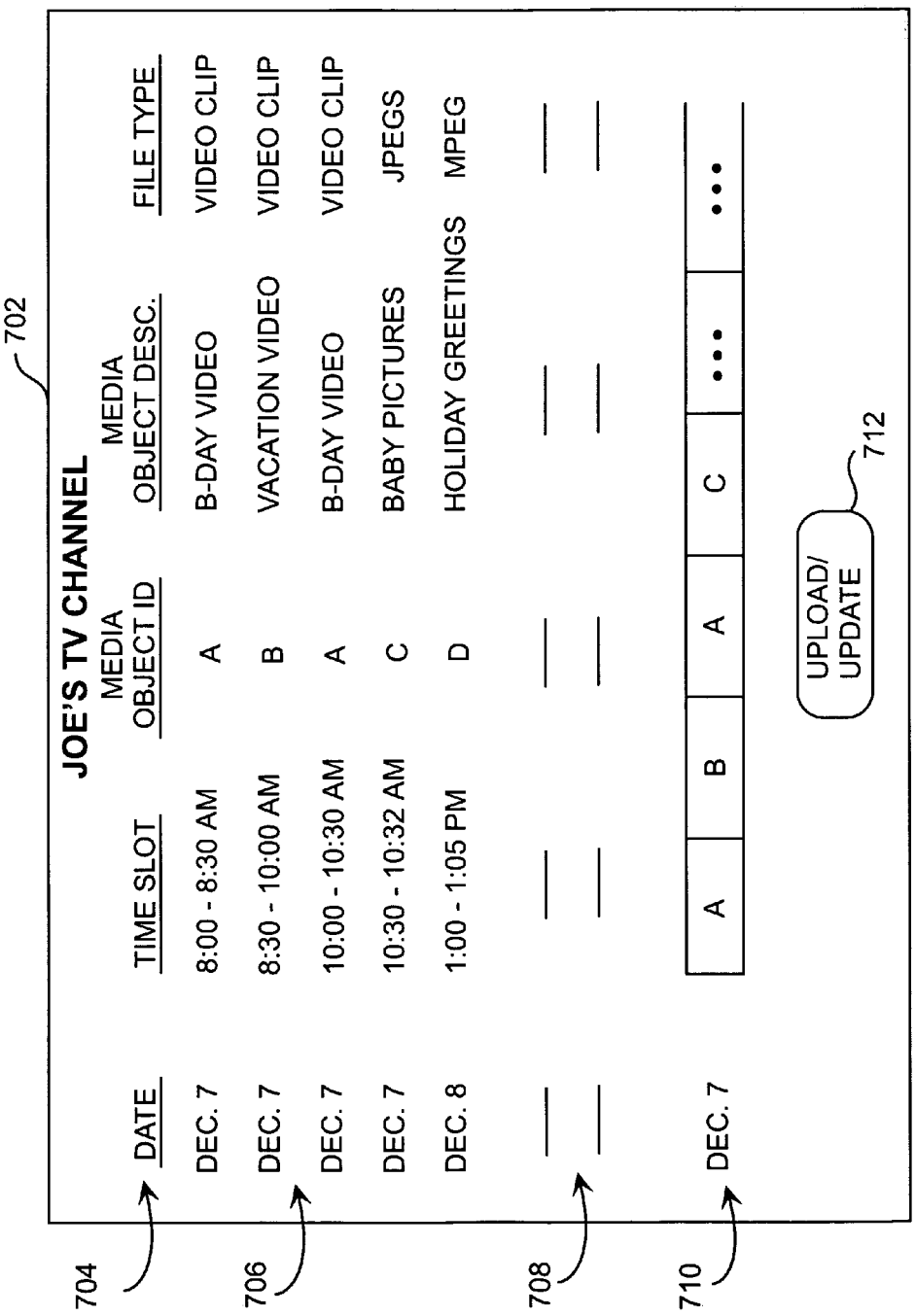
FIG. 7 shows a second example of an interface that can be used to schedule media objects for a media program in accordance with an embodiment of the invention.

FIG. 7 shows a second example of a user interface 702, according to an embodiment of the invention, that can be used with a PC or with the set top box 504 to organize various media objects into one or more media programs for a synthetic channel. A plurality of headings 704 identifies a corresponding plurality of fields 706 where the individual can enter media object information or preferences. As an example, the headings 704 can include identifiers for date, time slot, media object identifier (ID), media object description, file type, preview video, etc. Other fields may be present where the uploading individual can provide not just schedule information but also other program information, such as actors, players, personalities, director, story summary, previews of the media object (preview of an audio track or a preview video clip), etc. that are all accessible/displayable from the EPG 153.

FIG. 7 shows an example where the individual has entered preferences in the fields 706 for December 7 and 8 timeslots. The various media objects can include file types such as video clip file types (e.g., flash, .wav files, etc.), JPEGs, MPEGs, etc., and can be media objects covering subjects such as a birthday, vacation, baby pictures, holiday greetings from family members, etc. In one embodiment, a media object can be comprised solely of audio, such that the end user hears an audio presentation without accompanying video. Furthermore, one or more of the media objects can be scheduled for replay or repeat, such as the birthday video scheduled for play times at 8:00–8:30 AM and at 10:00–10:30 AM. The replay can be scheduled explicitly by the individual, or done so automatically by software of the interface 702.

The baby pictures can be one or more still shots, and so may be chosen for a shorter play time, such as between 10:30–10:32 AM as shown in the interface 702. Any number of sequences, time slots, length of play time, etc. options are possible according to the preferences of the individual. If a given media object does not itself fill a full time slot, then the individual can replay portions of the media object to fill up the remainder of the time slot, leave the remainder of a time slot blank, or play other media objects to fill up the remainder of the time slot. If the individual schedules more then one media object for the same time slot, then the server or the interface 702 can notify the individual, and re-sequence the media objects appropriately.

Additional empty fields 708 are available so that the individual can enter additional settings/preferences. In one embodiment, the individual enters most of the data in the fields 706 and 708. In another embodiment, the interface 702 includes more automatic features, such as automatic setting of time slots, so that the amount of time slot calculation and other input from the individual can be reduced.

The interface 702 can include a display 710 that can readily display a sequence of programming for any given day or time. Other formats of the display 710 are possible to assist the individual in setting and reviewing preferences. An upload/update button 712 can be pressed by the individual to send/save the settings to the server.

In an embodiment of the invention, the local studio 106, cable service provider 108, or other party knows of or has access to information related to the media objects stored by the upload source 122 in the server via the interface 702. This allows these parties to provide hypertext links, EPG information, subscription services, or other data to inform the end user of the availability of the media objects for viewing and then to provide access to the media objects if requested by the end user. In one embodiment, this access can also be embodied into pay-per-view methods and treated as video-on-demand (VOD), audio-on-demand (AOD), or other on-demand methods for other objects. In addition, in this or other embodiments, these parties can insert advertising at marked spots in the media objects.

In an embodiment of the invention, the media objects can be provided via the TCP/IP channel of the communication link 155 to the set top box 152. In this manner, the playing of the media objects on the TCP/IP channel appears similar to a normal television channel to the end user. That is, Joe's TV Channel is a personal channel that can be provided to and selected by end users, and the end users can tune to the uploaded media program(s) accessible via this channel and view them similarly to regular television programming.

Thus, in one embodiment of the invention, Joe's TV Channel is an example of a "synthetic channel" or a "synthetic broadcast channel" that simulates a conventional television broadcast channel and that can be provided to end users via subscription, in a manner that can be similar to subscribing to conventional television broadcast channels via the cable service provider 108. The broadcast schedule of the media objects or media programs uploaded by the upload source 122 can be published to potential end users. Such publication can be public (e.g., publication of the schedule on a web page of the web site 124), or private (e.g., by sending e-mails or other communication to friends and family, including oral communication via telephone). In one embodiment, such publication may be in a format that can be incorporated into the EPG 153 and combined with listings of traditional television broadcast channels.

FIG. 8 shows a first EGP 802 that is provisioned to include a synthetic channel 804 in accordance with an embodiment of the invention. As shown in the EPG 802, the media objects or media programs that have been previously uploaded to the web site 124, using the interface 506 of FIGS. 5–6, are now correspondingly identified in the program listings for the synthetic channel 804. The user can subsequently tune to or select the synthetic channel 804 to view specific media programs according to their displayed air times. In the EPG 802, the information for television programs of the available conventional television broadcast channels is also displayed concurrently with the information for the synthetic channel 804.

The EPG 802 can include, or be interfaced with, an underlying component to allow reception of instructions to access and display media object(s) if the synthetic channel 804 is selected. This component can be embodied in software, hardware, or both, and can include functionality to communicate with the web site 124, process URL addresses or other addresses, monitor or poll the web site 124 for media program information, provision or subscribe the EPG 802, synchronize the displayed information in the EPG 802 with the actual transmission of media objects from the server 508, etc.

Figure 9:
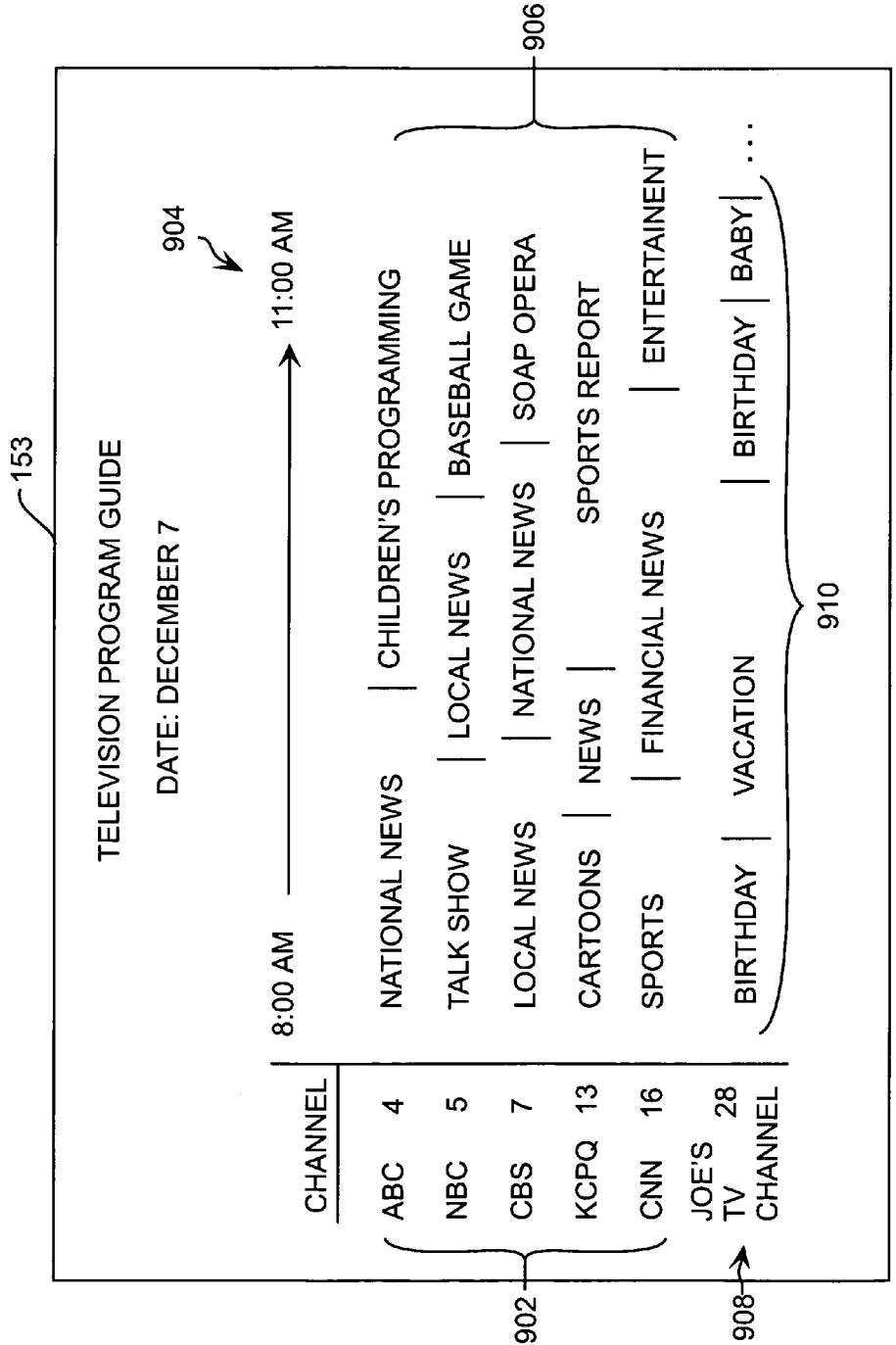
FIG. 9 shows a second electronic program guide that is provisioned to include a synthetic channel in accordance with an embodiment of the invention.

FIG. 9 shows a second EPG, such as the EPG 153, which can be used to provide/display information related to the synthetic channel according to one embodiment of the invention. The EPG 153 can be displayed on a dedicated television channel, or it may be displayed on any suitable television channel in response to the end user's pressing of a button 172 of the remote control unit 158 of FIG. 1. A button 174 of the remote control unit 158 may be used to tune the television set 154 to any of the television channels displayed in the EPG 153.

The EPG 153 of FIG. 9 shows television programming information for December 7, for example. The displayed programming information includes a list of local and national television channels 902 (along with their channel numbers). The displayed information also shows time slots 904 for corresponding television programs 906 of each television channel 902. The displayed information of the EPG 153 also includes a listing 908 that identifies programming for Joe's TV Channel that was created using the interface 702 of FIG. 7. The listing 908 identifies the time slots, descriptions, and lengths (collectively shown at 910) of the media program that the upload source 122 created and is now making available to end users for viewing.

The listing 908 for Joe's TV Channel can appear on the EPG 153 after the end user has subscribed to receive the synthetic channel, in an embodiment. Thereafter, the end user can use the button 174 of the remote control unit 158 to tune to the television set 154 to the synthetic channel. Alternatively or in addition, the listing 908 may be provided without prior subscription, and the end user can subsequently choose to watch the program(s) through subscription.

Figure 10:
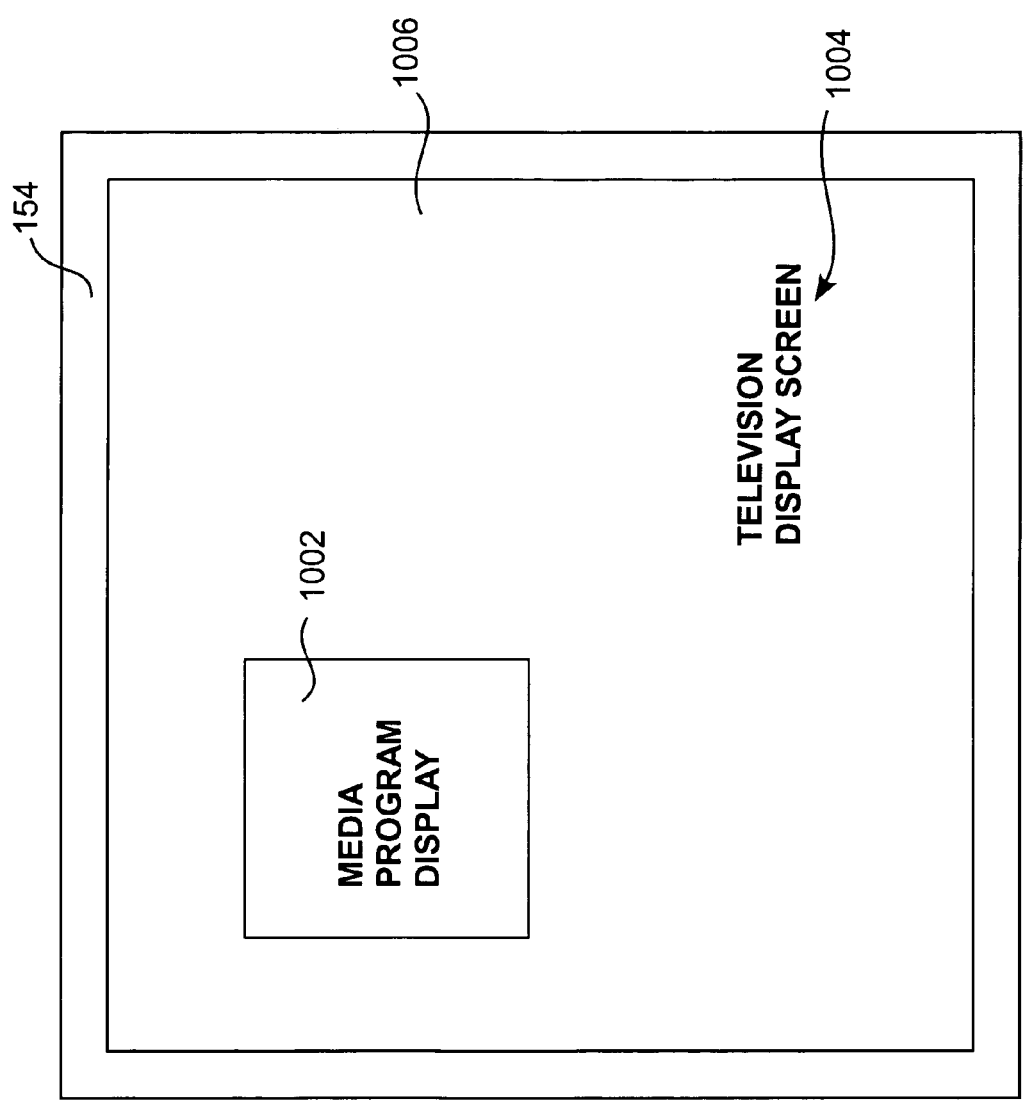
FIG. 10 illustrates a synthetic channel displayed on a portion of a display screen in accordance with an embodiment of the present invention.

FIG. 10 illustrates a synthetic channel or media program 1002 displayed on a portion of a display screen 1004 of the television set 154 in accordance with an embodiment of the present invention. In the embodiment shown in FIG. 6, the media program 1002 can be displayed in a viewing area that is smaller than the entire viewing area of the display screen 1004. A conventional television program 1006 can be concurrently displayed in areas of the display screen 1004 that are not occupied by the media program 1002. In other embodiments, it is possible to display the media program 1002 over the entire display screen 1004, display the media program 1002 over a portion of the display screen 1004 without concurrently viewing the conventional television program 1006, view multiple media programs 1002 on the display screen 1004 (e.g., allocate display areas of the display screen 604 for concurrent viewing of media programs), etc.

Figure 11:
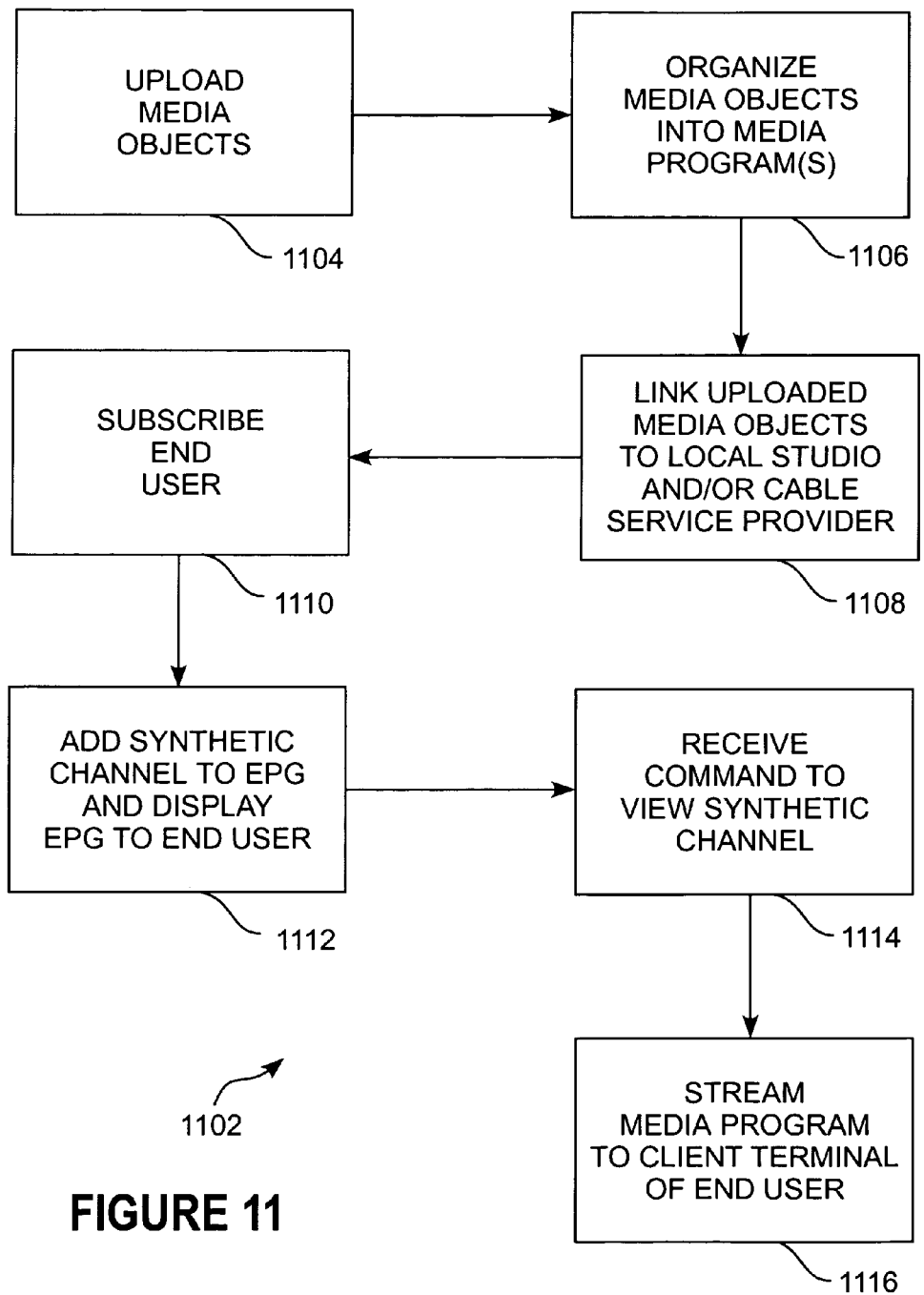
FIG. 11 is a flow diagram illustrating another method to provide a media program to a synthetic channel in accordance with an embodiment of the invention.

Shown next in FIG. 11 is a flow diagram 1102 illustrating another method to provide a media program to a synthetic channel in accordance with an embodiment of the invention. Components of the flow diagram 1102 may be embodied, in whole or in part, by software or machine-readable instructions stored in one or more machine-readable media, such as read-only memory (ROM), random access memory (RAM), cache(s), magnetic tape drives, hard disk drives, floppy disks, compact disks (CDs), digital versatile disks (DVDs), etc. The machine-readable medium or media may be located at the set top box 152 or other local storage unit, at one or more servers accessible to the interactive video casting systems 100, 200, 300 of FIGS. 1–3, or at other suitable locations.

Beginning at a block 1104, the individual (e.g., the upload source 122) uploads media objects to a server. As described above, many different types of media objects can be uploaded by the upload source 122, and uploading techniques can include techniques that are known to those skilled in the art or would be known to those skilled in the art based on the description provided herein. At a block 1106, the individual organizes the uploaded media objects into one or more media programs for eventual broadcast to end users. The embodiment of the interface 702 of FIG. 7 (and related software and tools) can be used to organize the media objects based on time slot, date, sequence, topic, or other preferences/settings of the individual.

At a block 1108, the uploaded objects are linked to the local studio 106, to the cable service provider 108, or to another party. This linking allows these parties to recognize the availability of the media programs, and to reserve synthetic channels that the end user can use to view the media programs. The linking at the block 1108 also allows these parties to identify a URL address or other address where the media program can be accessed, provide the URL address as part of the television broadcast, and incorporate the URL address, synthetic channel(s), and/or media programs into the EPG 153.

At a block 1110, the end user is subscribed, thereby providing the end user with access to the EPG 153 that lists the synthetic channel and/or making the end user eligible to receive the media programs. Several techniques, singly or in combination, can be made available to subscribe the end user. For instance, the upload source 122 or the end user can contact the cable service provider 108 and request that the synthetic channel be added to the EPG 153, in a manner similar to the end user requesting a subscription to a conventional cable television channel. A subscription token can be emailed to the end user as an attachment, from the upload source 122 or from another party. When installed or launched, the subscription token updates the EPG 153 stored in the set top box 152 to add the synthetic channel as an available channel and interfaces the set top box 152 with the local studio 106, the cable service provider 108, and/or the web site 124 so that the EPG 153 can receive media program listings and/or the set top box 152 can receive the media programs themselves. Another technique to subscribe the end user is to allow the end user to navigate (via Internet browsing capabilities/features of the set top box 152, for example) to the web site 124. Upon reaching the web site 124, a piece of software, such as a Java applet or Javascript, is automatically downloaded from the web site 124 to the set top box 152, and triggers an update of the EPG 153 stored in the set top box 152 to add synthetic channel listings. Alternatively or in addition, a signal can be sent to the cable service provider's 108 head-end to add a subscription to the end user's provisioning data.

The end user's subscription to the synthetic channel(s) can be in several possible formats. The subscription can be based on time (e.g., actual viewing time or hourly), based on periods (e.g., daily, weekly, monthly, or yearly subscription), one-time (e.g., somewhat like a "pay-per-view" basis), or based on when new media programs are made available by the upload source 122.

In an embodiment of the invention, a piracy-discouragement feature can be provided. The piracy-discouragement feature can be a log that tracks upload sources 122 that create web sites 124, subscribers or recipients to the synthetic channels, and media objects made available through the synthetic channel. In this manner, the piracy-discouragement feature can track unauthorized end users or upload sources, origins/destinations of pirated/copyrighted/unauthorized media objects, etc. Other piracy discouragement features can include an embodiment of encryption technologies that can use symmetric keys for the media program and the encryption of the symmetric keys with Public/Private Key Interfaces (PKI).

The subscription at the block 1110 can comprise part of or be separate from a block 1112. After subscription at the block 1110, the synthetic channel(s) are added to the EPG 153 at the block 1112, which can involve providing show times, channel locations, media program summaries, etc., and then displaying the updated EPG 153 for viewing by the end user. In one embodiment, the EPG 153 can be updated by the web site's 124 sending of EPG data for the synthetic channel to the set top box 152, via the TCP/IP channel. The EPG data can include the media program settings specified by the upload source 122 using the interface 702 of FIG. 7. A URL address for the web site 124 can be provided to the set top box 152, and then the set top box 152 can subsequently connect to that URL address to request and receive the latest programming information. The EPG 153 is then updated with the latest programming information.

At the block 1112, the media programs are thus available via the synthetic channel(s). As described above, the media programs can be provided as a dedicated stream per subscriber. In another embodiment, the media program(s) can be multicasted to several subscribers who tune to the synthetic channel. In yet another embodiment, the media programs can be broadcasted to all end users (and not just necessarily subscribers). In such a case, password protection, encryption, or other techniques can be used to ensure that only authorized end users can view the broadcasted media programs (e.g., unauthorized end users view a scrambled signal), if the upload source 122 wishes to only have selected send users view the media programs.

At a block 1114, a command is received and processed to view media programs in a synthetic channel. Such a command can be sent, for example, if the end user presses the button 174 on the remote control unit 158 to tune to the desired synthetic channel. Upon receipt of the command from the remote control unit 158, the set top box 152 tunes to the synthetic channel so that the media programs can be viewed by the end user on the television set 154. In one embodiment of the invention, the media programs are transmitted on the synthetic channel based on the program settings set by the upload source 122, and independently of any action by the end user. Thus, the media programs may be transmitted according to schedule regardless of whether the end user has actually tuned to the synthetic channel. Therefore, the end user can choose to watch the media programs at the specified times, not watch at all, or record the media programs for later viewing. In another embodiment, the transmission of the media programs on the synthetic channel can be done so in response to the end user's request to receive the media programs. In yet another embodiment, the transmission of the media programs can occur in advance of the scheduled times so that the media programs are available for immediate display when the end user selects the media program.

Next at a block 1116, the media programs are streamed or otherwise transmitted to the client terminal (e.g., to the set top box 152) for eventual viewing by the end user. Thus, as evident by the various embodiments described herein, the Internet "browsing" that an end user typically has to perform to view content from the Internet is replaced in an embodiment of the invention by placing or hiding "browsing" functions in the EPG 153. In this manner, a simpler and more familiar technique can be provided to end users to view Internet content, by simply tuning to a particular television channel.

In conclusion, an embodiment of the invention allows an individual to upload media objects to a server and to specify a manner in which the media objects are to be played as a media program to an end user. The media program can be provided to the end user via a synthetic channel, which can be tuned to by the end user as if tuning to a conventional television broadcast channel. Information related to the synthetic channel such as media program listings, can be provided in an electronic program guide. If the synthetic channel is selected by the end user from the electronic program guide, the media program(s) scheduled by the individual who uploaded the media objects are streamed to a client terminal of the end user for viewing.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

For example, techniques have being describe above for embodiments where an end user having the television set 154 can contact the cable service provider 108 to access the synthetic channel and to receive media programs provided via the synthetic channel. In such an embodiment or in an embodiment that involves broadcast of the media program over a computer network or other IP broadcast medium, the end user may tune to the synthetic channel by designating a network address, port number, or other address of the end user's client terminal to the sever having the uploaded media objects. The end user may also indirectly designate the network address or port number of the client terminal by forwarding a descriptor (such as the name, email address, or other identifying information of the upload source 122) or other information to a server (or entity). The server can maintain a cross-reference database that links such descriptors to appropriate network addresses and port numbers of client terminals.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
   uploading media objects of different file types including audio-only files and audio/video files to a website hosted on a server;
   accessing the website with a web-based application to schedule and organize the media objects including the audio-only files and audio/video files into a media program;
   establishing a synthetic channel as a channel among a plurality of broadcast channels of an interactive video casting system;
   provisioning the synthetic channel with information to access and display the media program if the synthetic channel is selected by a client terminal; and
   providing the media program to the client terminal via the synthetic channel.

2. The method of claim 1 wherein the interactive video casting system comprises an interactive television system.

3. The method of claim 1 wherein providing the media program to the client terminal comprises streaming the media program from the server.

4. The method of claim 1 wherein provisioning the synthetic channel includes subscribing the client terminal to receive the media program via the synthetic channel.

5. The method of claim 4 wherein subscribing the client terminal to receive the media program comprises using a subscription token to add the synthetic channel as a channel recognizable by the client terminal.

6. The method of claim 4 wherein subscribing the client terminal to receive the media program comprises obtaining address information of the client terminal.

7. The method of claim 6, further comprising linking the address information of the client terminal with identifying information associated with the server.

8. The method of claim 1, further comprising:
   providing an electronic program guide having programming information displayable therein;
   obtaining programming information associated with the media program from the server; and
   adding the programming information associated with the media program into the electronic program guide to indicate availability of the media program via the synthetic channel.

9. The method of claim 1 wherein the media program can be provided to the client terminal in response to a command sent from the client terminal that requests the media program.

10. The method of claim 1 wherein the synthetic channel comprises part of a transmission control protocol/Internet protocol (TCP/IP) channel.

11. The method of claim 1, further comprising providing a piracy-discouragement feature to track a source and a destination of at least one media object.

12. An article of manufacture, comprising:
a machine-readable medium having stored thereon machine-readable instructions to:
receive media objects of different file types including audio-only files and audio/video files that are uploaded to a website hosted on a server;
schedule and organize the media objects including the audio-only files and audio/video files into a media program based on user entered inputs to the website;
designate a synthetic channel as a channel among a plurality of broadcast channels of an interactive video casting system;
provision the synthetic channel with information to access and display the media program if the synthetic channel is selected by a client terminal; and
provide the media program to the client terminal via the synthetic channel.

13. The article of manufacture of claim 12 wherein the machine-readable medium further includes instructions stored thereon to stream the media program to the client terminal from the server.

14. The article of manufacture of claim 12 wherein the machine-readable instructions to provision the synthetic channel includes instructions to subscribe the client terminal to receive the media program via the synthetic channel.

15. The article of manufacture of claim 12 wherein the machine-readable medium further includes instructions stored thereon to:
provide an electronic program guide having programming information displayable therein;
obtain programming information associated with the media program from the server; and
add the programming information associated with the media program into the electronic program guide to indicate availability of the media program via the synthetic channel.

16. An electronic program guide (EPG), comprising:
a first set of displayable programming information related to programs available via a group of broadcast channels of an interactive video casting system;
a second set of displayable programming information related to a media program available via a synthetic channel different from broadcast channels among the group of broadcast channels, the media program including media objects of different file types including audio-only files and audio/video files and organized and scheduled by a web-based application; and
a component to allow reception of instructions to access and display the media program if the synthetic channel is selected.

17. The EPG of claim 16 wherein the first and second sets of displayable programming information are storable at a client-side storage location coupled to a client terminal.

18. The EPG of claim 16 wherein the second set of displayable programming information is obtainable from a storage location associated with the uploaded media object.

19. The EPG of claim 16 wherein the second set of displayable programming information is displayable subsequent to use of the component to perform a subscription of a client terminal that is capable to trigger display of the first set of displayable programming information.

20. The EPG of claim 16 wherein the second set of displayable programming information is capable of being updated via use of the component.

21. The EPG of claim 16, further comprising an address indicative of a source of at least one media object.

22. The EPG of claim 21 wherein the address comprises a uniform resource locator (URL) address.

23. A system, comprising:
an interactive video casting network capable to provide programs via broadcast channels to a client terminal, at least one of the broadcast channels comprising a synthetic channel capable to provide the client terminal with a media program having media objects of different file types including audio-only files and audio/video files uploaded via a communication network to a website, wherein the media objects including the audio-only files and audio/video files are organized and scheduled by a web-based application, the interactive video casting network capable to provision the synthetic channel with information to access and display the media program if the synthetic channel is selected by the client terminal.

24. The system of claim 23 wherein the interactive video casting network comprises an interactive television network.

25. The system of claim 23 wherein the interactive video casting network is capable to provide the media program to a client terminal comprising an audio device.

26. The system of claim 23, further comprising a server in the communication network that is communicatively coupleable to the interactive video casting network and that stores the uploaded media objects.

27. The system of claim 26, further comprising an interface usable to allow input of schedule information related to the media program.

28. The system of claim 23, further comprising an electronic program guide (EPG) displayable by the client terminal, the EPG including programming information that can be updated to indicate availability of the media program via the synthetic channel.

29. The system of claim 23 wherein the interactive video casting network is capable to subscribe the client terminal to allow the client terminal to receive the media program via the synthetic channel.

* * * * *